Sept. 26, 1950  J. L. MAY  2,523,439
ROTATING CUTTING DISK POWER MOWER
Filed Jan. 22, 1948  2 Sheets-Sheet 1

INVENTOR.
JOSEPH L. MAY
BY
ATTY

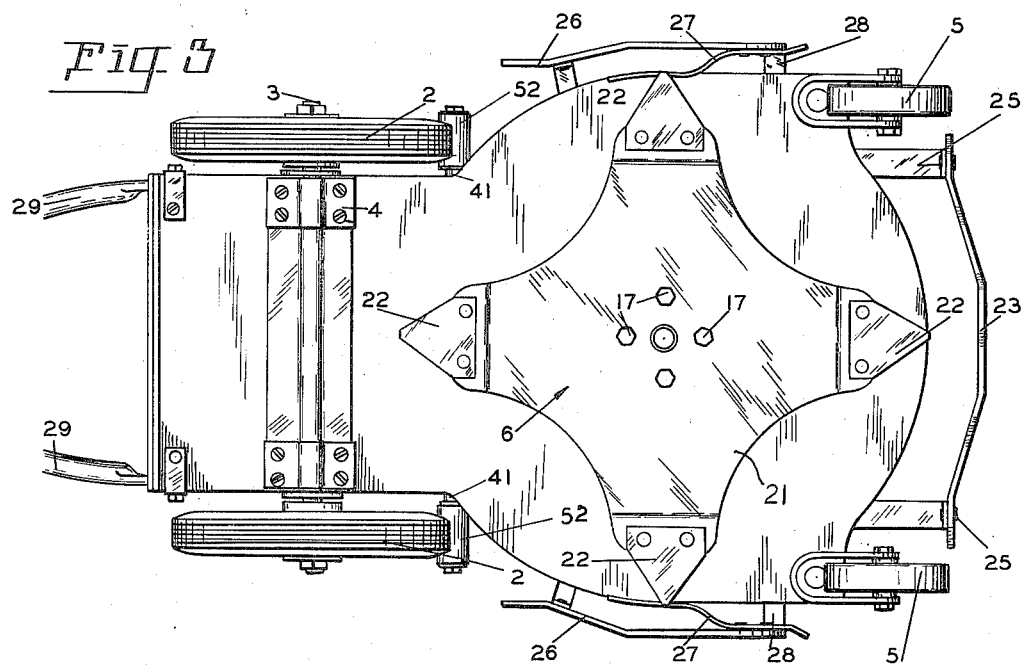
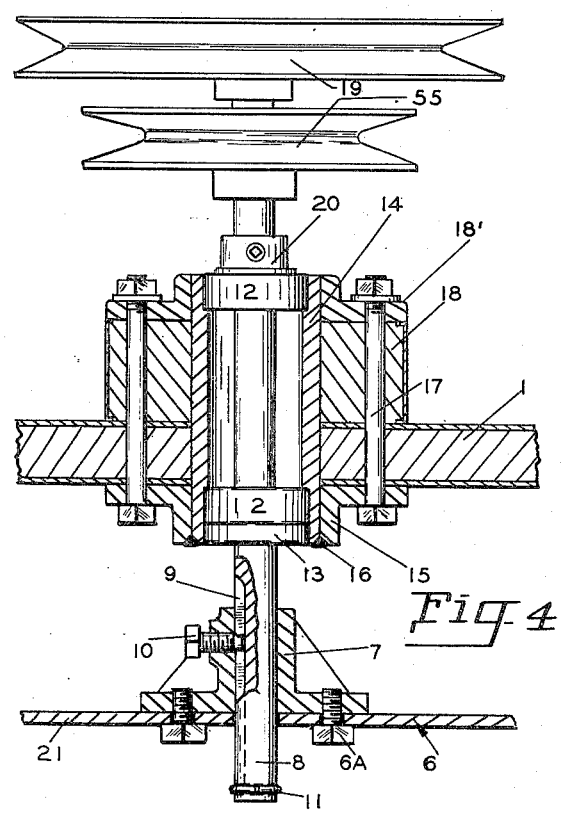
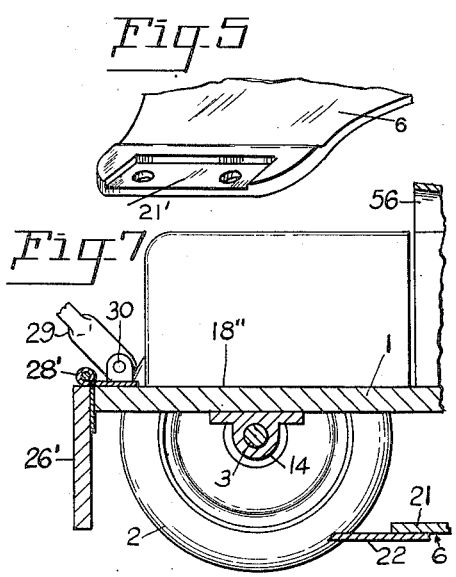

Patented Sept. 26, 1950

2,523,439

UNITED STATES PATENT OFFICE 2,523,439

ROTATING CUTTING DISK POWER MOWER

Joseph L. May, Portland, Oreg.

Application January 22, 1948, Serial No. 3,785

2 Claims. (Cl. 56—25.4)

This invention relates to lawn mowers and more particularly to lawn mowers that are power driven. This application is a continuation-in-part of my application Serial No. 755,073, filed June 17, 1947, now Patent 2,514,407.

The primary object of the invention is to provide a rotary blade lawn mower having a drive system that may be employed to rotate the blade and also to propel the mower over the ground surface.

It is another object of the invention to provide a power transmission system for a lawn mower that will permit selective driving and steering of the mower.

It is still another object of this invention to provide a horizontal rotary blade lawn mower having guards surrounding the path of the blade for protecting the operator as well as the blade while in operation.

It is a further object of the invention to provide a lawn mower having means for pulling the grass laterally into the path of the blade.

It is a still further object of the invention to provide a lawn mower having simplicity of design, economy of construction and efficiency of operation.

The novel features that are considered characteristic of the invention are set forth with particularity in the appended claims. The invention itself, however, both as to its organization and its method of operation, together with additional objects and advantages thereof, will best be understood from the following description of specific embodiments, when read in connection with the accompanying drawings, wherein like reference characters indicate like parts throughout and in which:

Figure 3 is an inverted plan view of the lawn mower illustrating the design of the rotor and the means for controlling the grass to be cut.

Figure 4 is an enlarged fragmentary cross-sectional view of the bearing for supporting the rotor on the frame of the mower.

Figure 5 is a fragmentary perspective view illustrating the mounting on the rotor for the cutter blades.

Figure 7 is a fragmentary cross-sectional view through the rear portion of a modified mower which is provided with a rear guard.

Figure 1:
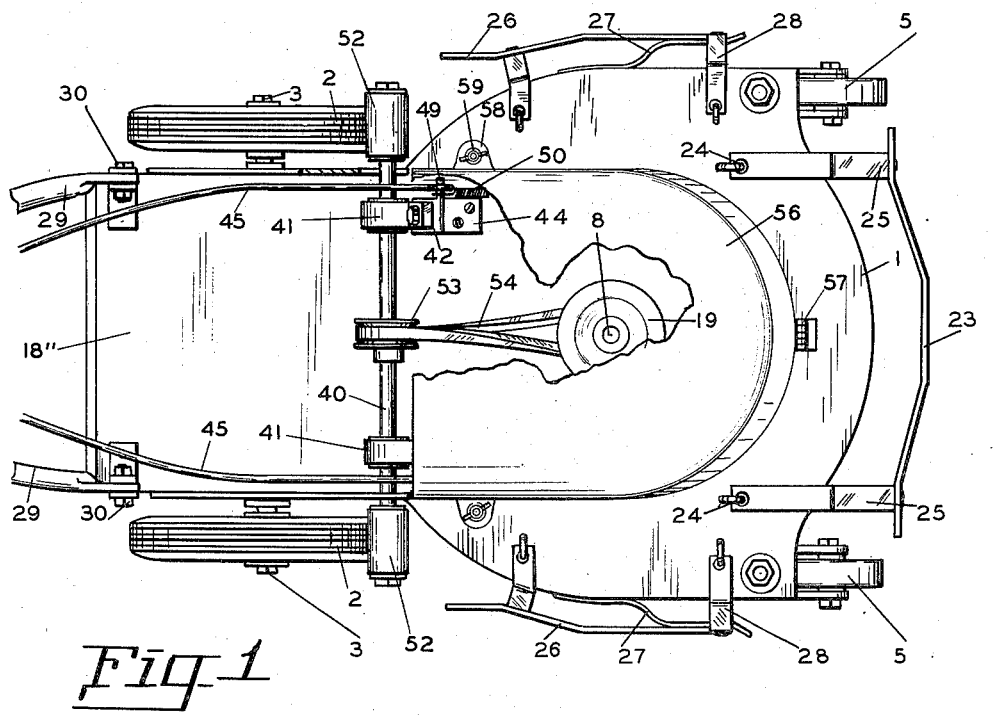
Figure 1 is a plan view of my new and improved lawn mower particularly illustrating the transmission for driving the same over the ground surface, parts being broken away for convenience of illustration.
Figure 2:
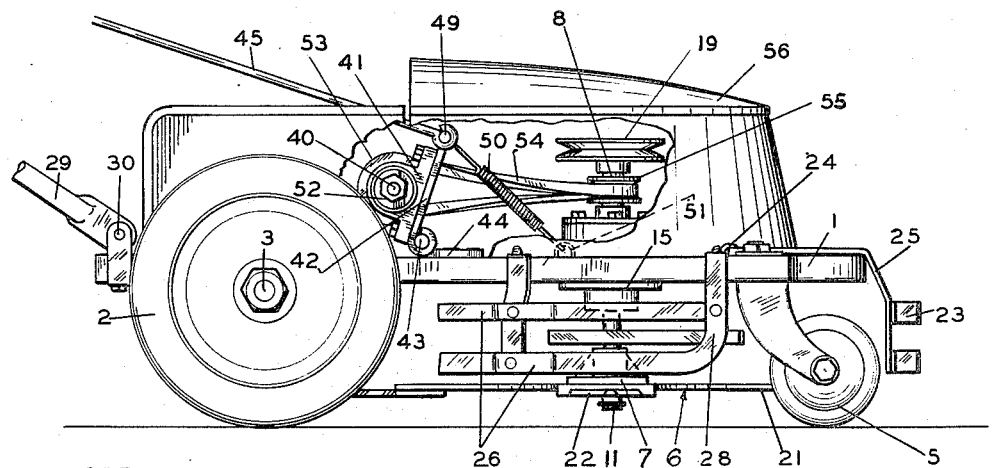
Figure 2 is a side view in elevation of the mower shown in Figure 1, parts being broken away for convenience of illustration.
Figure 6:
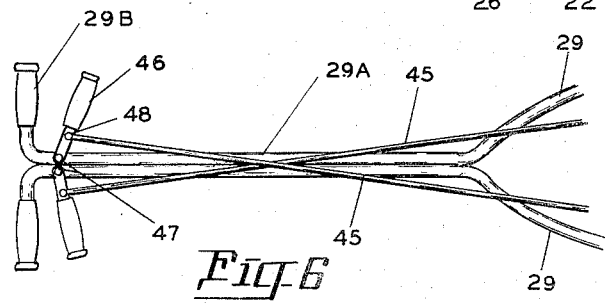
Figure 6 is a fragmentary plan view of the control levers for controlling the transmission system for moving the mower about.

Referring more specifically to the drawings, a lawn mower incorporating the present invention comprises a frame 1 which is mounted for mobility on rear wheels 2 and front wheels 5 and supports a horizontal blade rotor 6, as best shown in Figs. 2 and 3. The rear wheels 2 are journalled on a cross-shaft 3 which is secured to the underside of the frame 1 by clamps 4. The front wheels 5 extend forwardly of the frame 1 to be positioned beyond the cutting circle of the rotor blades, best illustrated in Figures 1, 2 and 3. While these wheels appear to be similar to caster wheels, they are held in a fixed position to stand clear of the blades. It is to be noted, as shown in Fig. 3, that the wheels 2 and 5 lie within the lateral limits of the blades.

The cutting rotor 6 is provided with a hub 7, best shown in Fig. 4, which is fixedly adjusted to the desired elevation on the vertical driving shaft 8 by means of a key way 9 cooperating and a set screw 10. The rotor is locked against accidental removal from the shaft 8 by the retainer ring 11 snapped around and seated in a groove adjacent the end of the shaft 8. The rotor 6 consists of a relatively thin body portion 21 having the removable cutter blades 22 secured thereto within the recessed brackets 21', shown in Fig. 5. The body portion 21 of the rotor is shaped to insure strength and rigidity.

The vertical shaft 8 is journalled within spaced bearings 12 which in turn are fixedly mounted within a vertically disposed tubular member 14, the lower bearing 12 being held in position by a dust proof retainer ring 13. The shaft 8 is held relative to the upper bearing 12 by the collar 20 which permits adjustment of the elevation of said shaft relative to the mower and to the motor.

The vertical tubular member 14 has a flange 15 fixed thereto, as by welding 16, and this flange is secured to the frame 1 by the stud bolts 17 which also pass through a spacer 18 and an upper flange 18'. The spacer 18 provides a relatively long bearing support for the shaft 8 to absorb the strain applied to the driven pulley 19 by a source of power (not here shown). This source of power is usually a gasoline motor mounted upon the rear area 18" of the frame, however, an electric motor may be employed.

One of the features of the present invention resides in guards 23 and 26. The guard 23 is pivotally mounted to the frame 1 by supporting arms 25 swung on eye bolts 24. The guards 26 are pivotally mounted to the sides of the frame 1 by the arms 28 which are pivoted on similar eye bolts 24. If desired, a guard 26' may be pivotally suspended from the rear edge of the frame 1 by a hinge 28', as shown in Fig. 7. This rear guard 26' is pivoted outwardly to pass over any obstacles such as roots or rocks. It will be noted that all of the guards may swing outwardly to permit access to the machine, but cannot swing inwardly into the path of the blades.

In order to keep the side guards 26 at a safe distance from the ends of the cutter 22, I provide a deflecting guard 27 for catching the grass and pulling the same in to the cutters, best illustrated in Figures 1 and 3. This is an important feature, as the mower can be brought relatively close to walls, hedges and the like, still pulling the grass into the cutter, but at the same time spacing the guards 26 a safe distance from the cutters to protect the feet of the operator of the mower.

A handle 29 is pivotally mounted to the frame 1 at 30 and has handle bars 29B located on its opposite and upper end. One of the outstanding features of my improved lawn mower is the method of driving the same over the ground surface. A cross shaft 40 is journalled within bearings 41 which in turn are fixedly mounted to the brackets 42. The brackets 42 are pivotally mounted to the frame 1 at 43 by way of the bracket 44. The position of the bearings and their brackets is regulated by the control rods 45 which are pivotally connected to the control handles 46 at 48, the control handles 46, in turn, being pivotally connected at 47 to the handle 29A. The control rods 45 are pivotally connected to the bearing brackets 41 at 49, the brackets being resiliently retracted by the springs 50, which are fixedly secured to the frame 1 at 51.

Friction drive rollers 52 are keyed to the shaft 40 for engagement with the peripheries of the wheels 2 when the control handles 46 are operated. The shaft 40 is in turn driven through the pulley 53 keyed to the same and the belt 54 which is driven from the pulley 55 fixedly secured to the shaft 8. The driving pulleys and the belt 54 are enclosed by a cover 56 which is hingedly secured to the frame 1 at 57 and releasably secured to the frame 1 by the ears 58 and wing nuts 59.

I will now describe the operation of my new and improved lawn mower. The shaft 8 is driven by either an electric or gas motor. This in turn drives the cross shaft 40. When it is desired to move the machine straight forward, both of the control handles 46 are pulled towards the handle bars 29B by the operator. This pulls the control rods 45 and the upper ends of the pivotally mounted brackets 42 together with the shaft 40 and the friction rollers 52 into contact with the tires of the wheels 2 driving the machine straight forward.

In the event it is desired to turn in either direction only one of the control handles 46 is pulled by the operator. This will pull one of the friction rollers 52 into engagement with one of the wheels 2, which will cause the machine to be driven around in a circle. The only time the machine will be driven by the drive shaft 40 is when either or both of the handle bars are pulled by the operator towards the handle bars 29B.

While I show a belt 54 driving the shaft 40 from the driven shaft 8, I would not care to be limited to this, as the shaft 40 could be the shaft of a motor, the motor taking the place of the pulley 53. The controlling of the control levers for bringing the friction rollers into engagement with the wheels 2 would still operate under these conditions. This system of drive is a very simple system and can be applied to other types of lawn mowers, or other uses.

Although a certain specific embodiment of the invention has been shown and described, it is obvious that many modifications thereof are possible. The invention, therefore, is not to be restricted except insofar as is necessitated by the prior art and by the spirit of the appended claims.

That which is claimed as new, is:

1. A mower comprising a frame, a vertically disposed shaft supported by said frame, a horizontal rotor mounted on said shaft, mower blades carried by said rotor, means for driving said shaft to rotate said rotor and revolve said blades, rollers supporting said frame for mobility and being positioned within the lateral limits of the revolving path of said blades, and guides mounted at the sides of said frame and having their forward ends angled upwardly to extend laterally of the blade path and bias vegetation laterally of the blades into said blade path.

2. A mower comprising, in combination, a frame, a vertically disposed shaft supported by said frame, a horizontal rotor mounted on said shaft below said frame, mower blades carried by said rotor, drive means connected to said shaft for driving said shaft to rotate said rotor and revolve said blades, wheels supporting said frame for mobility, a pair of said wheels being spaced on a horizontal axis, a horizontal shaft, hinges mounted on said frame and supporting said horizontal shaft adjacent each end thereof to position said shaft substantially parallel with said wheel axis but permit limited angular movement of said shaft, friction rollers carried by said shaft for respective peripheral engagement with said spaced wheels, belt drive means between said vertical and horizontal shafts for driving said horizontal shaft while permitting movement thereof, springs connected between said frame and the opposite ends of said horizontal shaft for biasing the respective rollers from wheel engagement, a handle connected to said frame, levers pivotally connected to said handle at the handle end thereof, and links extending between said levers and the ends of said horizontal shaft respectively for selectively engaging the rollers with the wheels.

JOSEPH L. MAY.

REFERENCES CITED

The following references are of record in the file of this patent:

UNITED STATES PATENTS

| Number | Name | Date |
|---|---|---|
| 1,627,252 | Peters | May 3, 1927 |
| 1,805,927 | Sharp | May 19, 1931 |
| 1,819,791 | Reed | Aug. 18, 1931 |
| 1,992,494 | Lundin | Feb. 26, 1935 |
| 2,188,110 | Fahnestock | Jan. 23, 1940 |
| 2,208,972 | Goodall | July 23, 1940 |